(12) United States Patent
Cohen et al.

(10) Patent No.: US 10,647,329 B2
(45) Date of Patent: May 12, 2020

(54) DISENGAGING AUTONOMOUS CONTROL OF VEHICLE

(71) Applicant: UATC, LLC, San Francisco, CA (US)

(72) Inventors: Eyal Cohen, San Francisco, CA (US); Nancy Yung Hui Sun, San Francisco, CA (US); Thomas Lawrence Smith, Rodeo, CA (US)

(73) Assignee: UATC, LLC, San Francisco, CA (US)

( * ) Notice: Subject to any disclaimer, the term of this patent is extended or adjusted under 35 U.S.C. 154(b) by 0 days.

(21) Appl. No.: 15/928,739

(22) Filed: Mar. 22, 2018

(65) Prior Publication Data

US 2019/0176842 A1  Jun. 13, 2019

Related U.S. Application Data

(60) Provisional application No. 62/597,805, filed on Dec. 12, 2017.

(51) Int. Cl.
*B60W 50/08* (2020.01)
*G05D 1/00* (2006.01)
*B60W 10/18* (2012.01)
*B60W 10/04* (2006.01)
*B60W 10/20* (2006.01)

(52) U.S. Cl.
CPC .......... *B60W 50/082* (2013.01); *B60W 10/04* (2013.01); *B60W 10/18* (2013.01); *B60W 10/20* (2013.01); *G05D 1/0061* (2013.01); *B60W 2300/10* (2013.01); *B60W 2300/12* (2013.01)

(58) Field of Classification Search
CPC .... B60W 50/082; B60W 10/04; B60W 10/18; B60W 10/20; B60W 2300/10; B60W 2300/12; G05D 1/0061
USPC .......................................................... 701/23
See application file for complete search history.

(56) References Cited

U.S. PATENT DOCUMENTS

| 4,862,115 A | 8/1989 | Lee et al. |
| 9,201,421 B1* | 12/2015 | Fairfield ............... B60W 40/04 |
| 9,616,896 B1 | 4/2017 | Letwin et al. |
| 9,836,056 B2* | 12/2017 | Ansari ................. G05D 1/0212 |

(Continued)

OTHER PUBLICATIONS

"Automaker Using Tech to Keep Drivers Alert Following Tesla Autopilot Crash", Fortune, http://fortune.com/2017/06/23/tesla-autopilot-technology-keep-drivers-alert/, (Jun. 23, 2017), 4 pgs.

(Continued)

*Primary Examiner* — Atul Trivedi
(74) *Attorney, Agent, or Firm* — Schwegman Lundberg & Woessner, P.A.

(57) ABSTRACT

Various examples are directed to systems and methods for controlling a vehicle. Power may be provided to a cut-off valve in fluid communication between an automated control (AC) valve and a shuttle valve. The cut-off valve may be configured to open in response to the power, causing fluid communication between the AC valve and the shuttle valve. A vehicle autonomy system may modulate the AC valve to control a level of pressurized air provided from a pressurized air reservoir to a foundation brake via the AC valve and the shuttle valve. In response to an automated disengage signal, the cut-off valve may close to prevent pressurized air from reaching the shuttle valve via the AC valve and permit pressurized air to reach the shuttle valve via a pedal valve.

20 Claims, 11 Drawing Sheets

(56) References Cited

U.S. PATENT DOCUMENTS

| | | | |
|---|---|---|---|
| 9,902,393 B2* | 2/2018 | Endo | B60W 20/19 |
| 10,078,338 B2* | 9/2018 | Smartt | H04W 4/46 |
| 2002/0107618 A1* | 8/2002 | Deguchi | B60K 6/442 |
| | | | 701/22 |
| 2006/0116803 A1 | 6/2006 | Armbruster et al. | |
| 2007/0198145 A1 | 8/2007 | Norris et al. | |
| 2008/0296106 A1 | 12/2008 | Nilsson | |
| 2009/0204280 A1* | 8/2009 | Simon, Jr. | B60K 6/48 |
| | | | 701/22 |
| 2013/0131905 A1 | 5/2013 | Green et al. | |
| 2013/0158838 A1* | 6/2013 | Yorke | B60W 30/18018 |
| | | | 701/103 |
| 2013/0201316 A1* | 8/2013 | Binder | H04L 67/12 |
| | | | 348/77 |
| 2014/0139341 A1 | 5/2014 | Green et al. | |
| 2014/0260233 A1* | 9/2014 | Giovanardi | F15B 13/0444 |
| | | | 60/431 |
| 2015/0224845 A1* | 8/2015 | Anderson | B60G 17/019 |
| | | | 701/37 |
| 2016/0298758 A1* | 10/2016 | Fujiyoshi | F16H 61/0204 |
| 2016/0334790 A1* | 11/2016 | Rust | B62D 15/0215 |
| 2016/0357187 A1* | 12/2016 | Ansari | G01S 15/931 |
| 2017/0092131 A1* | 3/2017 | Fairfield | G08G 1/22 |
| 2017/0137023 A1* | 5/2017 | Anderson | B60G 17/0195 |
| 2017/0369010 A1* | 12/2017 | Tarte | B60W 10/04 |
| 2017/0372431 A1* | 12/2017 | Perl | G07C 5/085 |
| 2018/0050699 A1* | 2/2018 | Gauthier | B60W 30/18009 |
| 2018/0056982 A1* | 3/2018 | Endo | B60W 10/18 |
| 2018/0210464 A1* | 7/2018 | Switkes | G05D 1/0295 |
| 2018/0297209 A1* | 10/2018 | Low | G06K 9/00664 |
| 2019/0176862 A1* | 6/2019 | Kumar | B61L 15/0081 |

OTHER PUBLICATIONS

"Cadillac Super Cruise System", Cadillac, http://media.gm.com/media/us/en/cadillac/news.detail.html/content/Pages/news/us/en/2017/apr/0410-supercruise.html, (Apr. 10, 2017), 5 pgs.

"Waymo Report to CA board—Waymo's software can detect errors and hand control to the user", Waymo, https://www.dmv.ca.gov/portal/wcm/connect/946b3502-c959-4e3b-b119-91319c27788f/GoogleAutoWaymo_disengage_report_2016.pdf?MOD=AJPERES, (Jan. 5, 2017), 34 pgs.

Baime, A. J., "Can an Autonomous Audi Beat a Pro-Driver on a Race Track?", Road and Track, http://www.roadandtrack.com/car-culture/a27200/819-roa-2015-12-01-the-analysis-man-vs-machine-67-5/, (Dec. 1, 2017), 20 pgs.

Davies, Alex, "Audi's New A8 Shows How Robocars Can Work With Humans", Transportation, https://www.wired.com/story/self-driving-car-user-interface/, (Jul. 11, 2017), 11 pgs.

Muoio, Danielle, "I was behind the wheel when a self driving Uber failed—here's what happens", Business Insider, (Dec. 24, 2016), 17 pgs.

* cited by examiner

DISENGAGING AUTONOMOUS CONTROL OF VEHICLE

CLAIM FOR PRIORITY

This application claims the benefit of priority of U.S. Provisional Application 62/597,805, filed Dec. 12, 2017, which is hereby incorporated by reference in its entirety.

FIELD

The document pertains generally, but not by way of limitation, to devices, systems, and methods for disengaging autonomous control of a vehicle.

BACKGROUND

An autonomous vehicle is a vehicle that is capable of sensing its environment and operating some or all of the vehicle's controls based on the sensed environment. An autonomous vehicle includes sensors that capture signals describing the environment surrounding the vehicle. The autonomous vehicle processes the captured sensor signals to comprehend the environment and automatically operates some or all of the vehicle's controls based on to the resulting information.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DESCRIPTION

Examples described herein are directed to systems and methods for disengaging one or more vehicle controls (e.g., braking, steering, or throttle) of an autonomous vehicle (AV).

In an autonomous or semi-autonomous vehicle, a vehicle autonomy system controls one or more of the braking, steering, or throttle of the vehicle. In a fully-autonomous vehicle, the vehicle autonomy system assumes full control of the vehicle. In a semi-autonomous vehicle, the vehicle autonomy system assumes a portion of the vehicle control, with a human user (e.g., a vehicle operator) still providing some control input.

In an autonomous or semi-autonomous vehicle, there are instances when vehicle autonomy system is disengaged and the human user assumes full control of the vehicle. The human user may wish to assume control, for example, if the human user detects that the vehicle autonomy system is controlling the vehicle in an unusual manner or simply because the driver is finished using the vehicle autonomy system. Also, in some examples, the vehicle autonomy system detects that it is in an error condition and needs to transfer control to the human user. Also, the AV system may be disengaged if the vehicle is stopped and not in use.

When control of the vehicle is transferred from the vehicle autonomy system to the human user, it may be desirable to end further control input from the vehicle autonomy system. For example, if the vehicle autonomy system attempts to steer, brake, or throttle the vehicle while the human user is also attempting to steer, brake, or throttle the vehicle, the human user's task becomes more difficult. Further, if the vehicle is not in use, it may be desirable to prevent the vehicle autonomy system from actuating a vehicle control. The vehicle autonomy system may disengage by ceasing to provide control signals to the steering, brake, or throttle of the vehicle. In some examples, however, it may take time for the vehicle autonomy system to cease providing control signals. Also, in some examples, the vehicle autonomy system may crash or freeze in a state where it continues to generate control signals even after disengagement.

Various examples described herein use one or more disengage switches to prevent the vehicle autonomy system from controlling braking, steering, and/or throttle of the vehicle after disengagement. A disengage switch is a hardware switch having at least one state in which the vehicle autonomy system is prevented from controlling one or more vehicle controls (e.g., braking, steering, throttle, etc.) Some of the examples described herein are directed to autonomous vehicles such as trucks or tractors that use air brakes.

Figure 1:
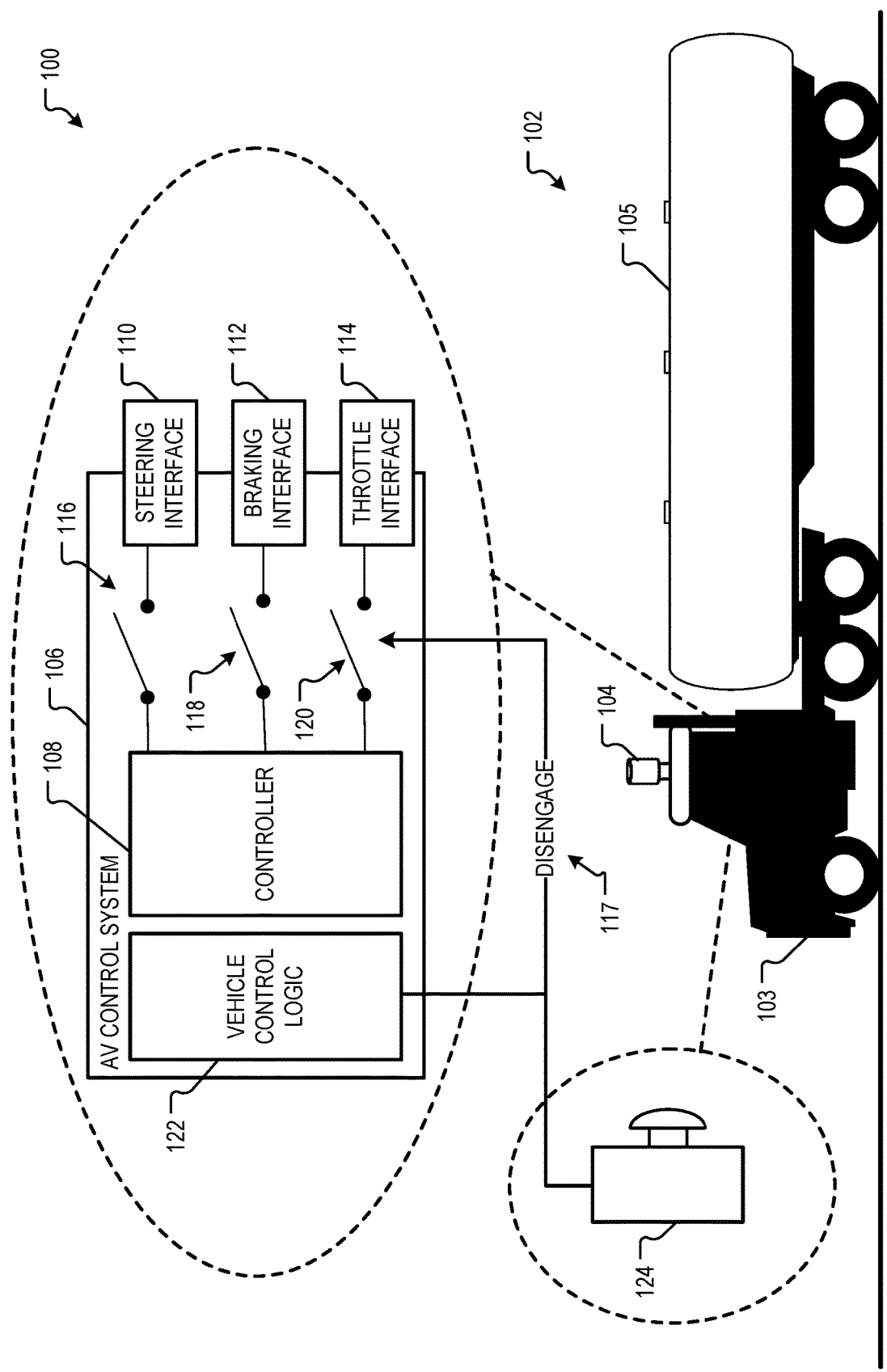
FIG. 1 is a diagram showing one example of an environment with a vehicle including a vehicle autonomy system with one or more disengage switches.

FIG. 1 is a diagram showing one example of an environment 100 with a vehicle 102 including a vehicle autonomy system 106 with one or more disengage switches 116, 118, 120. The vehicle 102, in some examples, is a self-driving vehicle (SDV) or autonomous vehicle (AV) comprising a vehicle autonomy system (e.g., FIG. 2) for operating the vehicle without human intervention. In some examples, the vehicle 102 also, in addition to or instead of a fully-autonomous mode, includes a semi-autonomous mode in which a human user is responsible for some or all control of the vehicle.

In the example of FIG. 1, the vehicle 102 is a tractor-trailer including a tractor 103 and a trailer 105. In various other examples, the vehicle 102 does not include a trailer and may be, for example, a dump truck, a bus, or any other similar vehicle. Also, in some examples, the vehicle 102 is a passenger vehicle.

The vehicle 102 has one or more remote detection sensors 104 that receive return signals from the environment 100. Return signals may be reflected from objects in the environment 100, such as the ground, buildings, trees, etc. The remote detection sensors 104 may include one or more active sensors, such as light detection and ranging (LIDAR), radio detection and ranging (RADAR), or sound navigation and ranging (SONAR) that emit sound or electromagnetic radiation in the form of light or radio waves to generate return signals. The remote detection sensors 104 may also include one or more active sensors, such as cameras or other imaging sensors, proximity sensors, etc. Information about the environment 100 is extracted from the return signals. In some examples, the remote detection sensors 104 include a passive sensor that receives reflected ambient light or other radiation, such as a set of stereoscopic cameras.

The vehicle autonomy system 106 includes vehicle control logic 122 that is configured to receive signals from the remote detection sensors 104 and determine a set of vehicle actions. For example, the vehicle control logic may include a perception system, a prediction system, a motion planning system, and/or a pose system, described in more detail with respect to FIG. 2. The vehicle autonomy system 106 also includes one or more controllers 108 that are electrically or otherwise connected to control interfaces 110, 112, 114 for various vehicle controls. A steering interface 110, for example, controls the steering input provided to the vehicle 102. A braking interface 112 controls the braking input provided to the vehicle 102. A throttle interface 114 controls the throttle control provided to the vehicle 102. The controller 108 receives one or more desired vehicle actions and translates the actions to a set of one or more control signals. Control signals are provided to control interfaces 110, 112, 114 to modify the respective controls.

Disengage switches 116, 118, 120 are positioned between the controller 108 and the various control interfaces 110, 112, 114. Upon receiving a disengage signal 117, one or more of the disengage switches 116, 118, 120 are opened to disconnect the controller 108 from the various interfaces 110, 112, 114. This prevents the interfaces 110, 112, 114 from further controlling the steering, braking, or throttle, respectively, of the vehicle 102. Although one disengage signal 117 is shown in FIG. 1, in some examples separate disengage signals are provided to disengage different control interfaces 110, 112, 114.

The disengage signal 117 may be generated in any suitable manner. In some examples, a disengage button 124 is positioned in the tractor 103 where it can be actuated by the human user. The human user actuates the disengage button 124 to assume control of the vehicle 102. When actuated, the disengage button 124 generates the disengage signal 117 and/or causes the disengage signal 117 to be generated.

In some examples, the disengage signal 117 is generated by the vehicle autonomy system 106. For example, the disengage signal 117 may be generated by the vehicle control logic 122 or other vehicle autonomy system component. The vehicle control logic 122 or other suitable component of the vehicle autonomy system 106 may detect an error state at the vehicle autonomy system 106 and generate the disengage signal 117 in response to the error state. One example error state occurs if the vehicle autonomy system 106, or a portion thereof, crashes or otherwise fails. In this case, the disengage signal 117 is generated to prevent vehicle autonomy system 106 from further affecting the controls of the vehicle 102 after the failure. Another example error state occurs if the vehicle autonomy system 106, e.g., via sensors 104, detects an object or objects in the vicinity of the vehicle that either cannot be identified or is identified as indicating that vehicle autonomy system 106 should no longer control the vehicle 102.

Figure 2:
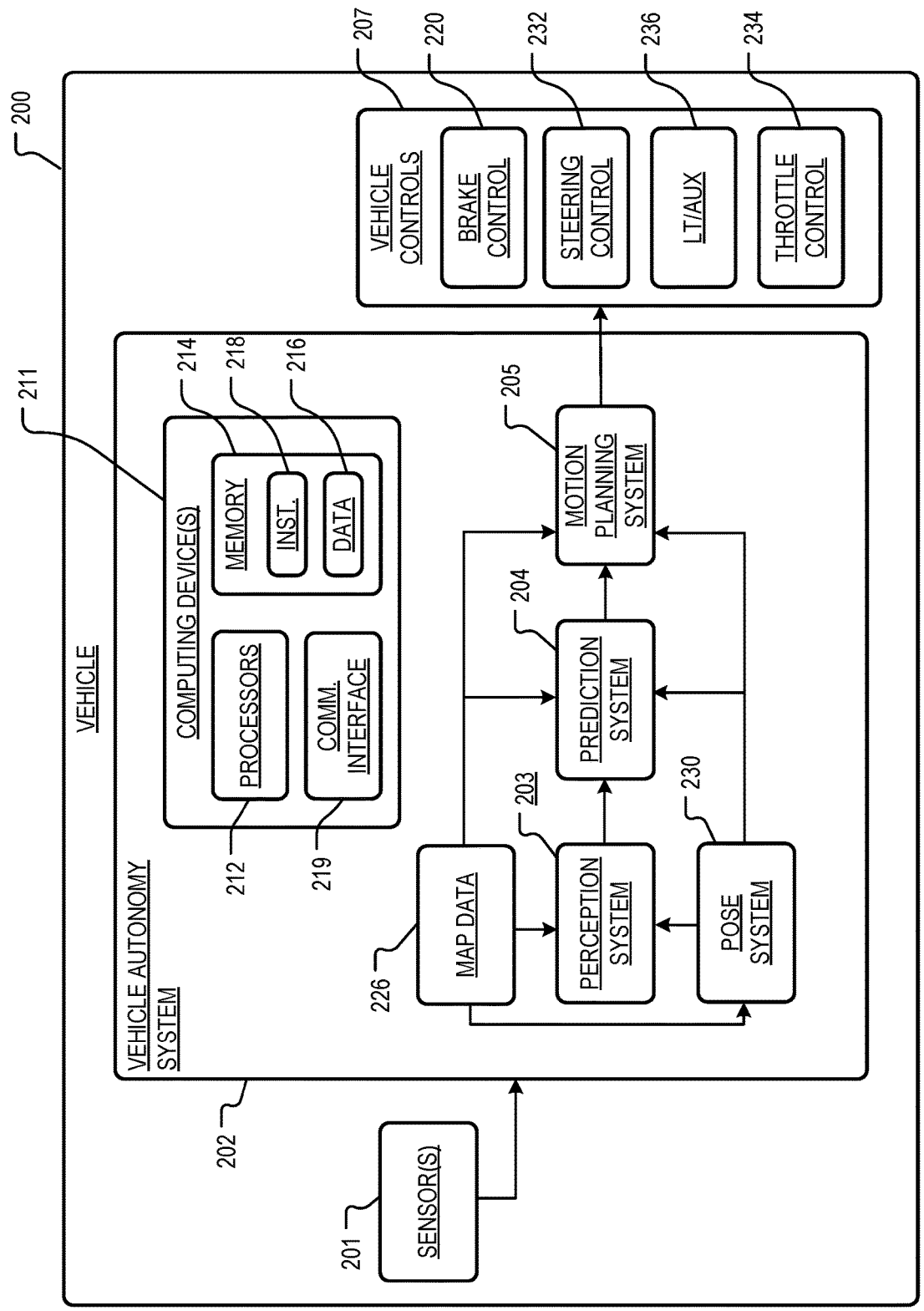
FIG. 2 depicts a block diagram of an example vehicle according to example aspects of the present disclosure.

FIG. 2 depicts a block diagram of an example vehicle 200 according to example aspects of the present disclosure. Vehicle 200 can be, for example, an autonomous or semi-autonomous vehicle. The vehicle 200 includes one or more sensors 201, a vehicle autonomy system 202, and one or more vehicle controls 207.

The vehicle autonomy system 202 can be engaged to control the vehicle 200 or to assist in controlling the vehicle 200. In particular, the vehicle autonomy system 202 receives sensor data from the one or more sensors 201, attempts to comprehend the environment surrounding the vehicle 200 by performing various processing techniques on data collected by the sensors 201, and generate an appropriate motion path through the environment. The vehicle autonomy system 202 can control the one or more vehicle controls 207 to operate the vehicle 200 according to the motion path.

The vehicle autonomy system 202 includes a perception system 203, a prediction system 204, a motion planning system 205, and a pose system 230 that cooperate to perceive the surrounding environment of the vehicle 200 and determine a motion plan for controlling the motion of the vehicle 200 accordingly. The pose system 230 may be arranged to operate as described herein.

Various portions of the autonomous vehicle system 202 receive sensor data from the one or more sensors 201. For example, the sensors 201 may include remote detection sensors as well as motion sensors such as an inertial measurement unit (IMU), one or more encoders, one or more odometers, etc. The sensor data can include information that describes the location of objects within the surrounding environment of the vehicle 200, information that describes the motion of the vehicle, etc.

The sensors 201 may also include one or more remote detection sensors or sensor systems, such as a LIDAR, a RADAR, one or more cameras, etc. As one example, a LIDAR system of the one or more sensors 201 generates sensor data (e.g., remote detection sensor data) that includes the location (e.g., in three-dimensional space relative to the LIDAR system) of a number of points that correspond to objects that have reflected a ranging laser. For example, the LIDAR system can measure distances by measuring the Time of Flight (TOF) that it takes a short laser pulse to travel from the sensor to an object and back, calculating the distance from the known speed of light.

As another example, for a RADAR system of the one or more sensors 201 generates sensor data (e.g., remote detection sensor data) that includes the location (e.g., in three-dimensional space relative to the RADAR system) of a number of points that correspond to objects that have reflected ranging radio waves. For example, radio waves (e.g., pulsed or continuous) transmitted by the RADAR system can reflect off an object and return to a receiver of the RADAR system, giving information about the object's location and speed. Thus, a RADAR system can provide useful information about the speed of an object.

As yet another example, one or more cameras of the one or more sensors 201 may generate sensor data (e.g., remote detection sensor data) including still or moving images.

Various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in image or images captured by the one or more cameras. Other sensor systems can identify the location of points that correspond to objects as well.

As another example, the one or more sensors 201 can include a positioning system. The positioning system can determine a current position of the vehicle 200. The positioning system can be any device or circuitry for analyzing the position of the vehicle 200. For example, the positioning system can determine a position by using one or more of inertial sensors, a satellite positioning system such as a Global Positioning System (GPS), based on IP address, by using triangulation and/or proximity to network access points or other network components (e.g., cellular towers, WiFi access points, etc.) and/or other suitable techniques. The position of the vehicle 200 can be used by various systems of the vehicle autonomy system 202.

Thus, the one or more sensors 201 can be used to collect sensor data that includes information that describes the location (e.g., in three-dimensional space relative to the vehicle 20) of points that correspond to objects within the surrounding environment of the vehicle 200. In some implementations, the sensors 201 can be located at various different locations on the vehicle 200. As an example, in some implementations, one or more cameras and/or LIDAR sensors can be located in a pod or other structure that is mounted on a roof of the vehicle 200 while one or more RADAR sensors can be located in or behind the front and/or rear bumper(s) or body panel(s) of the vehicle 200. As another example, camera(s) can be located at the front or rear bumper(s) of the vehicle 200 as well. Other locations can be used as well.

The pose system 230 receives some or all of the sensor data from sensors 201 and generates vehicle poses for the vehicle 200. A vehicle pose describes the position and attitude of the vehicle. The position of the vehicle 200 is a point in a three dimensional space. In some examples, the position is described by values for a set of Cartesian coordinates, although any other suitable coordinate system may be used. The attitude of the vehicle 200 generally describes the way in which the vehicle 200 is oriented at its position. In some examples, attitude is described by a yaw about the vertical axis, a pitch about a first horizontal axis and a roll about a second horizontal axis. In some examples, the pose system 230 generates vehicle poses periodically (e.g., every second, every half second, etc.) The pose system appends time stamps to vehicle poses, where the time stamp for a pose indicates the point in time that is described by the pose. The pose system 230 generates vehicle poses by comparing sensor data to map data 226 describing the surrounding environment of the vehicle 200. The pose system 230, in some examples, comprises one or more localizers and a pose filter. Localizers generate pose estimates based on remote-sensing data. The pose filter generates vehicle poses, for example, based on pose estimates generated by one or more localizers and on motion sensor data, for example, from an inertial measurement unit (IMU), odometers, other encoders, etc.

The perception system 203 detects objects in the surrounding environment of the vehicle 200 based on sensor data, map data 226 and/or vehicle poses provided by the pose system 230. Map data 226, for example, may provide detailed information about the surrounding environment of the vehicle 200. The map data 226 can provide information regarding: the identity and location of different roadways, segments of roadways, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway; traffic control data (e.g., the location and instructions of signage, traffic lights, or other traffic control devices); and/or any other map data that provides information that assists the vehicle autonomy system 202 in comprehending and perceiving its surrounding environment and its relationship thereto. A roadway may be a place where the vehicle can drive and may include, for example, a road, a street, a highway, a lane, a parking lot, a driveway, etc. The perception system 203 may utilize vehicle poses provided by the pose system 230 to place the vehicle 200 within the map data and thereby predict which objects should be in the vehicle's surrounding environment.

In some examples, the perception system 203 determines state data for one or more of the objects in the surrounding environment of the vehicle 200. State data may describe a current state of an object (also referred to as features of the object). The state data for each object describes, for example, an estimate of the object's: current location (also referred to as position); current speed (also referred to as velocity); acceleration; current heading; current orientation; size/shape/footprint (e.g., as represented by a bounding shape such as a bounding polygon or polyhedron); type/class (e.g., vehicle versus pedestrian versus bicycle versus other); yaw rate; distance from the vehicle 200; minimum path to interaction with the vehicle 200; minimum time duration to interaction with the vehicle 200; and/or other state information.

In some implementations, the perception system 203 can determine state data for each object over a number of iterations. In particular, the perception system 203 can update the state data for each object at each iteration. Thus, the perception system 203 can detect and track objects, such as vehicles, that are proximate to the vehicle 200 over time.

The prediction system 204 is configured to predict one or more future positions for an object or objects in the environment surrounding the vehicle 200 (e.g., an object or objects detected by the perception system 203). The prediction system 204 can generate prediction data associated with one or more of the objects detected by the perception system 203. In some examples, the prediction system 204 generates prediction data describing each of the respective objects detected by the perspective system 204.

Prediction data for an object can be indicative of one or more predicted future locations of the object. For example, the prediction system 204 may predict where the object will be located within the next 5 seconds, 20 seconds, 200 seconds, etc. Prediction data for an object may indicate a predicted trajectory (e.g., predicted path) for the object within the surrounding environment of the vehicle 200. For example, the predicted trajectory (e.g., path) can indicate a path along which the respective object is predicted to travel over time (and/or the speed at which the object is predicted to travel along the predicted path). The prediction system 204 generates prediction data for an object, for example, based on state data generated by the perception system 203. In some examples, the prediction system 204 also considers one or more vehicle poses generated by the pose system 230 and/or map data 226.

In some examples, the prediction system 204 uses state data indicative of an object type or classification to predict a trajectory for the object. As an example, the prediction system 204 can use state data provided by the perception system 203 to determine that particular object (e.g., an object classified as a vehicle) approaching an intersection and maneuvering into a left-turn lane intends to turn left. In such a situation, the prediction system 204 can predict a trajectory (e.g., path) corresponding to a left-turn for the vehicle such that the vehicle turns left at the intersection. Similarly, the prediction system 204 can determine predicted trajectories for other objects, such as bicycles, pedestrians, parked vehicles, etc. The prediction system 204 can provide the predicted trajectories associated with the object(s) to the motion planning system 205.

In some implementations, the prediction system 204 is a goal-oriented prediction system 204 that generates one or more potential goals, selects one or more of the most likely potential goals, and develops one or more trajectories by which the object can achieve the one or more selected goals. For example, the prediction system 204 can include a scenario generation system that generates and/or scores the one or more goals for an object and a scenario development system that determines the one or more trajectories by which the object can achieve the goals. In some implementations, the prediction system 204 can include a machine-learned goal-scoring model, a machine-learned trajectory development model, and/or other machine-learned models.

The motion planning system 205 determines a motion plan for the vehicle 200 based at least in part on the predicted trajectories associated with the objects within the surrounding environment of the vehicle, the state data for the objects provided by the perception system 203, vehicle poses provided by the pose system 230, and/or map data 226. Stated differently, given information about the current locations of objects and/or predicted trajectories of objects within the surrounding environment of the vehicle 20, the motion planning system 205 can determine a motion plan for the vehicle 200 that best navigates the vehicle 200 relative to the objects at such locations and their predicted trajectories on acceptable roadways.

In some implementations, the motion planning system 205 can evaluate one or more cost functions and/or one or more reward functions for each of one or more candidate motion plans for the vehicle 200. For example, the cost function(s) can describe a cost (e.g., over time) of adhering to a particular candidate motion plan while the reward function(s) can describe a reward for adhering to the particular candidate motion plan. For example, the reward can be of opposite sign to the cost.

Thus, given information about the current locations and/or predicted future locations/trajectories of objects, the motion planning system 205 can determine a total cost (e.g., a sum of the cost(s) and/or reward(s) provided by the cost function(s) and/or reward function(s)) of adhering to a particular candidate pathway. The motion planning system 205 can select or determine a motion plan for the vehicle 200 based at least in part on the cost function(s) and the reward function(s). For example, the motion plan that minimizes the total cost can be selected or otherwise determined. The motion plan can be, for example, a path along which the vehicle 200 will travel in one or more forthcoming time periods. In some examples, the motion plan also includes a speed path and/or an acceleration path for the vehicle 200. In some implementations, the motion planning system 205 can be configured to iteratively update the motion plan for the vehicle 200 as new sensor data is obtained from one or more sensors 201. For example, as new sensor data is obtained from one or more sensors 201, the sensor data can be analyzed by the perception system 203, the prediction system 204, and the motion planning system 205 to determine the motion plan.

Each of the perception system 203, the prediction system 204, the motion planning system 205, and the pose system, 204, can be included in or otherwise a part of a vehicle autonomy system configured to determine a motion plan based at least in part on data obtained from one or more sensors 201. For example, data obtained by one or more sensors 201 can be analyzed by each of the perception system 203, the prediction system 204, and the motion planning system 205 in a consecutive fashion in order to develop the motion plan. While FIG. 2 depicts elements suitable for use in a vehicle autonomy system according to example aspects of the present disclosure, one of ordinary skill in the art will recognize that other vehicle autonomy systems can be configured to determine a motion plan for an autonomous vehicle based on sensor data.

The motion planning system 205 can provide the motion plan to one or more vehicle controllers 207 to execute the motion plan. For example, the one or more vehicle controllers 207 can include a throttle controller 234, a brake controller 220, a steering controller 232, and/or other controllers, each of which is in communication with one or more vehicle control interfaces to control the motion of the vehicle 200.

The vehicle controllers 207 can include a brake controller 220. The brake controller 220 is configured to receive all or part of the motion plan and generate a braking command that applies (or does not apply) the vehicle brakes. For example, the brake controller 220 may send a command to a braking interface, such as the braking interface 112 of FIG. 1. In some examples, the brake controller 220 includes a primary system and a secondary system. The primary system may receive braking commands and, in response, brake the vehicle 200. The secondary system may be configured to determine a failure of the primary system to brake the vehicle 200 in response to receiving the braking command.

A steering controller 232 is configured to receive all or part of the motion plan and generate a steering command. The steering command is provided to a steering interface, such as the steering interface 110 of FIG. 1, to provide a steering input to steer the vehicle 200. A lighting/auxiliary controller 236 may receive a lighting or auxiliary command. In response, the lighting/auxiliary controller 236 may control a lighting and/or auxiliary system of the vehicle 200. Controlling a lighting system may include, for example, turning on, turning off, or otherwise modulating headlights, parking lights, running lights, etc. Controlling an auxiliary system may include, for example, modulating windshield wipers, a defroster, etc. A throttle controller 234 is configured to receive all or part of the motion plan and generate a throttle command. The throttle command is provided to a throttle interface, such as the throttle interface 114 of FIG. 1, to control the engine or other propulsion system of the vehicle 200.

The vehicle autonomy system 202 includes one or more computing devices, such as the computing device 211, which may implement all or parts of the perception system 203, the prediction system 204, the motion planning system 205 and/or the pose system 230. The example computing device 211 can include one or more processors 212 and one or more memory devices (collectively referred to as memory) 214. The one or more processors 212 can be any suitable processing device (e.g., a processor core, a microprocessor, an Application Specific Integrated Circuit (ASIC), a Field Programmable Gate Array (FPGA), a microcontroller, etc.) and can be one processor or a plurality of processors that are operatively connected. The memory 214 can include one or more non-transitory computer-readable storage mediums, such as Random Access Memory (RAM), Read Only Memory (ROM), Electrically Erasable Programmable Read Only Memory (EEPROM), Erasable Programmable Read Only Memory (EPROM), flash memory devices, magnetic disks, etc., and combinations thereof. The memory 214 can store data 216 and instructions 218 which can be executed by the processor 212 to cause the vehicle autonomy system 202 to perform operations. The one or more computing devices 211 can also include a communication interface 219, which can allow the one or more computing devices 211 to communicate with other components of the vehicle 200 or external computing systems, such as via one or more wired or wireless networks. Additional descriptions of hardware and software configurations for computing devices, such as the computing device(s) 211 are provided herein at FIGS. 10 and 11.

Figure 3:
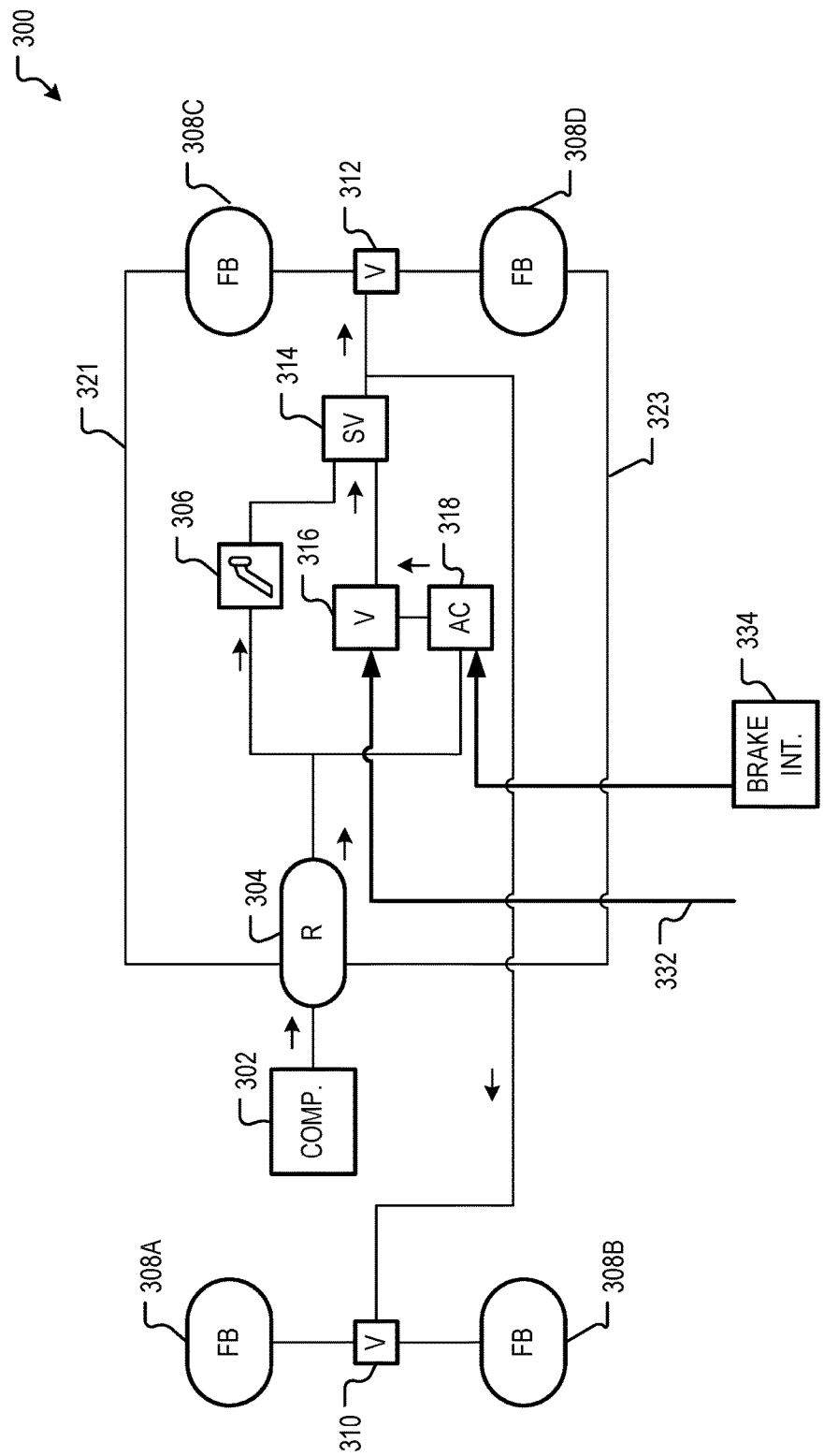
FIG. 3 is a diagram showing one example of a braking component that may be used in an autonomous vehicle.

FIG. 3 is a diagram showing one example of a braking component 300 that may be used in an autonomous vehicle, such as the vehicle 102 or 200. The braking component 300 is an air brake system, such as may be used in a truck, tractor-trailer, or any other suitable vehicle. The braking component 300 is shown in simplified form to demonstrate a cut-off valve 316, which may act to disengage the braking component 300 from a vehicle autonomy system upon receiving a disengage signal, such as a brake disengage signal on power line 332.

The braking component 300 includes a compressor 302 that may be powered by an engine of the vehicle. The compressor 302 provides pressurized air to a pressurized air reservoir 304. The pressurized air reservoir 304 is a tank or other reservoir that holds pressurized air when pressurized air is provided by the compressor 302. In some examples, the braking component 300 includes various other components related to the compressor 302 and pressurized air reservoir 304 such as, for example, a governor for regulating the air pressure in the pressurized air reservoir 304, an air dryer for removing moisture from air, various other reservoirs, etc.

Compressed air from the pressurized air reservoir 304 is used to actuate foundation brakes 308A, 308B, 308C, 308D. Foundation brakes include mechanisms positioned, for example, at the wheels or axels of the vehicle to slow or stop the wheels of the vehicle in response to the pressurized air. Any suitable type of foundation brake may be used including, for example, drum brake mechanisms, disc brake mechanisms, air over hydraulic brake mechanisms, wedge brake mechanisms, etc. In the example of FIG. 3, foundation brakes 308C, 308D (e.g., the rear brakes) also include spring brake lines 321, 323. Spring brake lines 321, 323 provide pressurized air to a spring brake mechanism at the foundation brakes 308C, 308D. The spring brake mechanisms engage the foundation brakes 308C, 308D when insufficient pressure is available on the spring brake lines 321, 323. In some examples, spring brake lines 321, 323 include one or more inversion valves, which may engage the spring brake mechanisms at the foundation brakes 308C, 308D if the pressure in the system drops to a level indicating a failure. Also, although four foundation brakes 308A, 308B, 308C, 308D are shown, different examples of the braking component 300 include different numbers of foundation brakes. For example, a vehicle with more than four wheels may include a foundation brake at each wheel. Also, in some examples, the braking component 300 is configured to be coupled to a trailer, which may also include one or more foundation brakes.

The pressurized air reservoir 304 is in fluid communication with a pedal valve 306 and with an automated control (AC) valve 318. In some implementations, the pedal valve 306 is referred to as a treadle valve. For example, a fluid, such as pressurized air, may travel between the pedal valve 306 and the AC valve 318. The pedal valve 306 may include and/or be used with a brake pedal that is controlled by the human user to apply and/or release the brakes. The AC valve 318 controlled by a vehicle autonomy system, such as 106 or 220, to also apply and/or release the brakes. The AC valve 318 is modulated by a brake interface 334. The brake interface 334 receives a braking control signal, for example, from a controller of a vehicle autonomy system, such as one or more of the controllers 108. The braking control signal indicates a level of braking called for by the vehicle autonomy system. In response to the braking control signal, the brake interface 334 modulates the state of the AC valve 318, for example, by moving the AC valve 318 from its current state to a more open position, moving the AC valve 318 from its current state to a more closed position, leaving the AC valve 318 in its current state, etc. This regulates the pressure passed by the AC valve 318.

In some examples, the AC valve 318 includes an electromechanical device or other suitable device for opening and closing the AC valve 318 in response to an electrical or other suitable signal from the brake interface 334. For example, the AC valve 318 may include a solenoid that opens and/or closes the AC valve 318. The brake interface 334 provides an electrical signal to the electro-mechanical device to modulate the AC valve 318. Modulating the AC valve 318 includes opening the AC valve 318, closing the AC valve 318, maintaining the current state of the AC valve 318, etc.

The AC valve 318 is in fluid communication with a cut-off valve 316. The cut-off valve 316 has, at least, an open position that passes pressurized air from the AC valve 318 to the shuttle valve 314 and a closed position that prevents pressurized air from passing. The cut-off valve 316 also includes an electro-mechanical device or other suitable device for moving the cut-off valve 316 between the open and the closed position in response to an electrical or other suitable signal. For example, the cut-off valve 316 is shown with a power line 332. The cut-off valve 316 is mechanically biased to the closed position. When no signal is provided at the power line 332 and/or the signal at the power line 332 is below a threshold power level, a spring of other suitable mechanical device biases the cut-off valve 316 to the closed position. When a sufficient signal is provided at the power line 332, the cut-off valve 316 transitions to the open position, permitting pressurized air to pass.

Pressurized air controlled by the pedal valve 306 and/or the AC valve 318 (via the cut-off valve 316) is provided to the shuttle valve 314. The shuttle valve 314 comprises a first input to receive pressurized air from the pedal valve 306 and a second input to receive pressurized air from the AC valve 318 (via the cut-off valve 316). An output of the shuttle valve 314 is in fluid communication with the foundation brakes 308A, 308B, 308C, 308D to actuate the foundation brakes 308A, 308B, 308C, 308D. One or more quick release valves 310, 312 and/or other components, may be positioned between the shuttle valve 314 and the foundation brakes 308A, 308B, 308C, 308D.

The shuttle valve 314 is configured to provide, at its output, the highest pressure provided at one of the inputs. For example, if the highest pressure is provided from the pedal valve 306 (indicating that the human user is calling for harder braking than vehicle autonomy system), then the shuttle valve 314 provides the pressure from the pedal valve 306 to the foundation brakes 308A, 308B, 308C, 308D. On the other hand, if the highest pressure is provided from the AC valve 318 and cut-off valve 316 (indicating that the vehicle autonomy system is calling for harder braking than the human user), then the shuttle valve 314 provides the pressure provided from the AC valve 318 and valve 316 to the foundation brakes 308A, 308B, 308C, 308D.

When a disengagement occurs, a brake disengage signal may be provided. In some examples, the brake disengage signal is provided to the cut-off valve 316, for example, by removing the signal at the power line 332 or reducing the signal at the power line 332 below a threshold level that overcomes the mechanical biasing of the cut-off valve 316 to the closed position. This breaks fluid communication between the AC valve 318 and the shuttle valve 314. As a result, the pressure provided at the output of the shuttle valve 314 is the pressure provided by the human user at the pedal valve 306 regardless of the state of the AC control valve 318. In this way, when the cut-off valve 316 is closed, the human user controls the braking component 300 via the pedal valve 306 without interference from the vehicle autonomy system, even if the vehicle autonomy system and brake interface 334 continues to modulate the AC valve 318 after disengagement.

Figure 4:
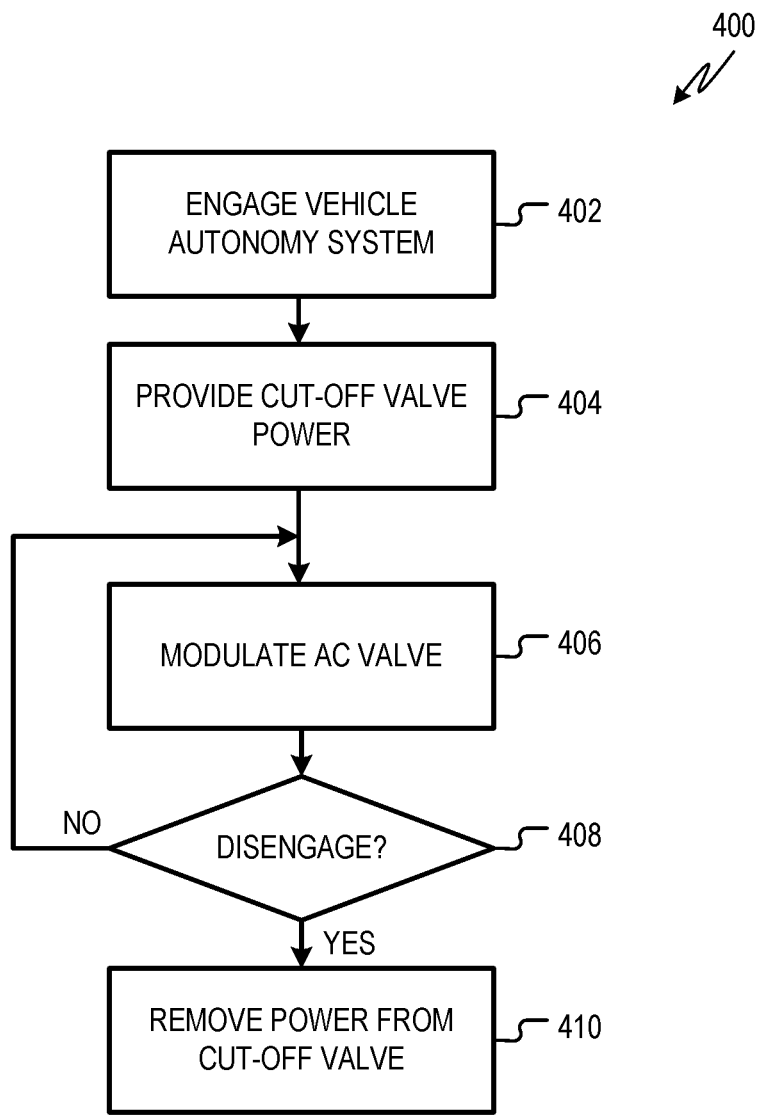
FIG. 4 is a flow chart showing one example of a process flow that may be executed by a vehicle autonomy system and/or a braking component, such as the braking component to execute disengagement as described herein.

FIG. 4 is a flow chart showing one example of a process flow 400 that may be executed by a vehicle autonomy system and/or a braking component, such as the braking component 300 to execute disengagement as described herein. At operation 402, the vehicle autonomy system is engaged. In some examples, the vehicle autonomy system is engaged before the vehicle begins to travel. Also, in some examples, the vehicle autonomy system is engaged while the vehicle is traveling, for example, by a human user.

At operation 404, power is provided to the cut-off valve. For example, referring to the example of FIG. 3, power may be provided to the cut-off valve 316 at power line 332. In some examples, the engaging of the vehicle autonomy system and the providing of power occur at the same time and/or via the same mechanism. For example, the vehicle autonomy system may be programmed to provide power to the cut-off valve at engagement. Also, in some examples, the power line to the cut-off valve is coupled to a switch that engages the vehicle autonomy system such that when the vehicle autonomy system is engaged, power is also provided to the cut-off valve 316.

At operation 406, the vehicle autonomy system modulates an AC valve to selectively apply and release the brakes, for example, according to a motion plan for controlling the motion of the vehicle. For example, referring to the example of FIG. 3, the vehicle autonomy system may modulate the AC valve 318 to modulate the brakes of the vehicle. At operation 408, the vehicle autonomy system determines if a disengage signal has been received. If not, the vehicle autonomy system continues to modulate the AC valve at operation 406. If, at operation 408, the vehicle autonomy system has received a disengage signal, then power is removed from the cut-off valve at operation 410. As described herein, this causes the cut-off valve 314 to close, which prevents any subsequent changes to the AD valve 318 from affecting the foundation brakes 308A, 308B, 308C, 308D.

In some examples, operation 408 and 410 are performed by the vehicle independent of the vehicle autonomy system. For example, the disengage signal is provided on power line 332 independent of the vehicle autonomy system. In response to the disengage signal, the cut-off valve 314 closes, preventing the AC valve 318 from further affecting the vehicle's braking.

Figure 5:
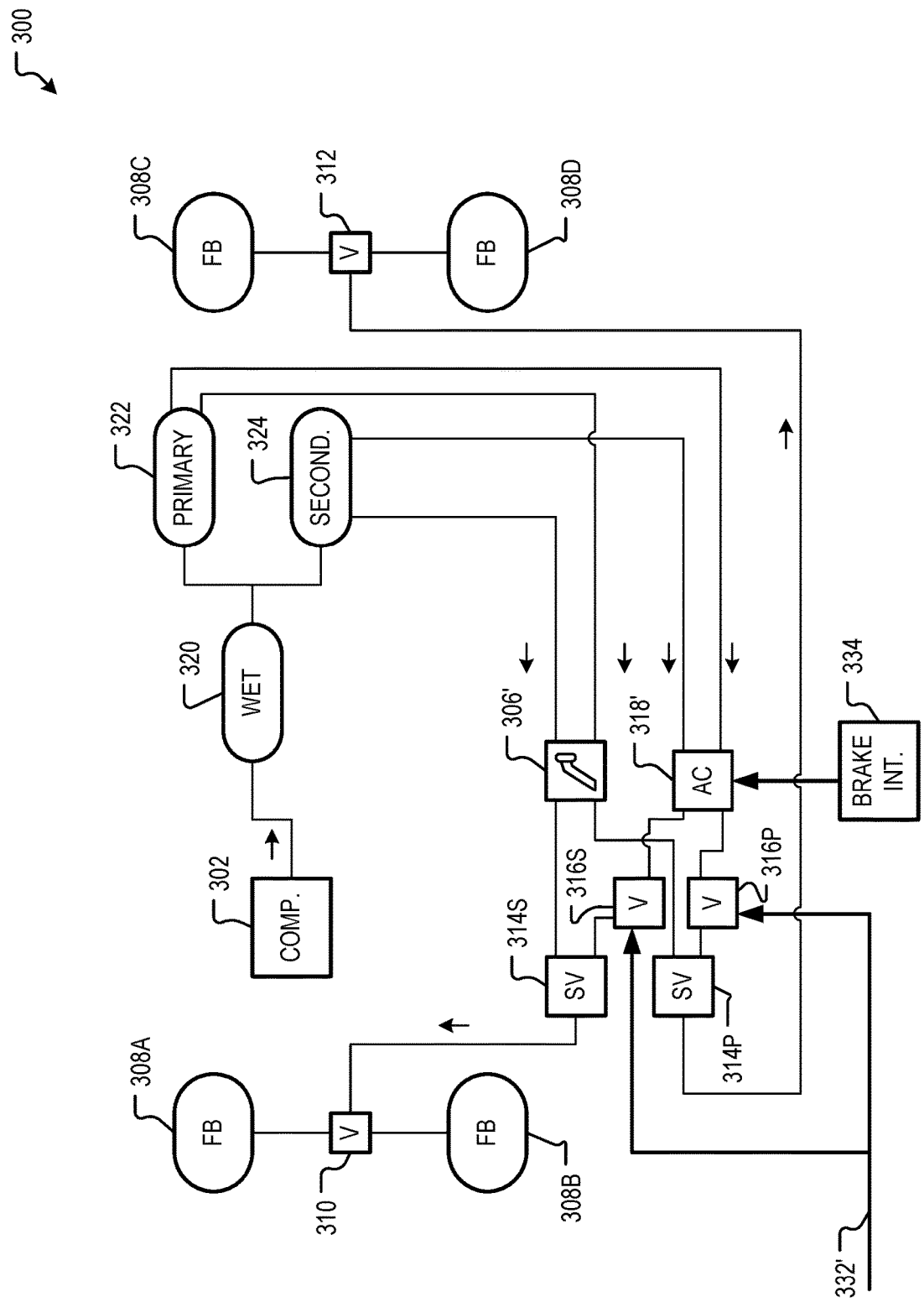
FIG. 5 is a diagram showing another example of the braking component 300 configured with a primary and secondary system.

FIG. 5 is a diagram showing another example of the braking component 300 configured with a primary and secondary system. For example, the compressor 302 is in fluid communication with a wet reservoir 320 to provide pressurized air to the wet reservoir 320. The wet reservoir 320 is in fluid communication with a primary reservoir 322 and a secondary reservoir 324. The primary reservoir 322 provides pressurized air to the front foundation brakes 308A, 308B via the pedal valve 306 and/or an AC valve 318' in conjunction with a cut-off valve 316S and shuttle valve 314S. The primary reservoir 322 is in fluid communication to provide pressurized air to the rear foundation brakes 308C, 308D via the AC valve 318' and a cut-off valve 316P and shuttle valve 314P. Cut-off valves 316S, 316P and shuttle valves 314S, 314P may operate in a manner similar to that described above with respect to cut-off valve 316 and shuttle valve 314.

In the example of FIG. 5, the pedal valve 306' and AC valve 318' are configured to regulate the primary system and the secondary system. For example, the state of the pedal valve 306' regulates pressure provided to both shuttle valves 314S, 314P, for example, in response to the position of a pedal selected by the human user. Similarly, the state of the AC valve 318' regulates pressure provided to both shuttle valves 314S, 314P, for example, in response to a single input provided by the brake interface 334. Also, as shown, the power line 332' is provided to both of the cut-off valves 316S, 316P. Accordingly, when the signal at the power line 332' is removed or reduced below a threshold, both cut-off valves 316S, 316P are mechanically biased to their closed position, preventing the AC valve 318' from affecting either the primary or the secondary braking systems.

Figure 6:
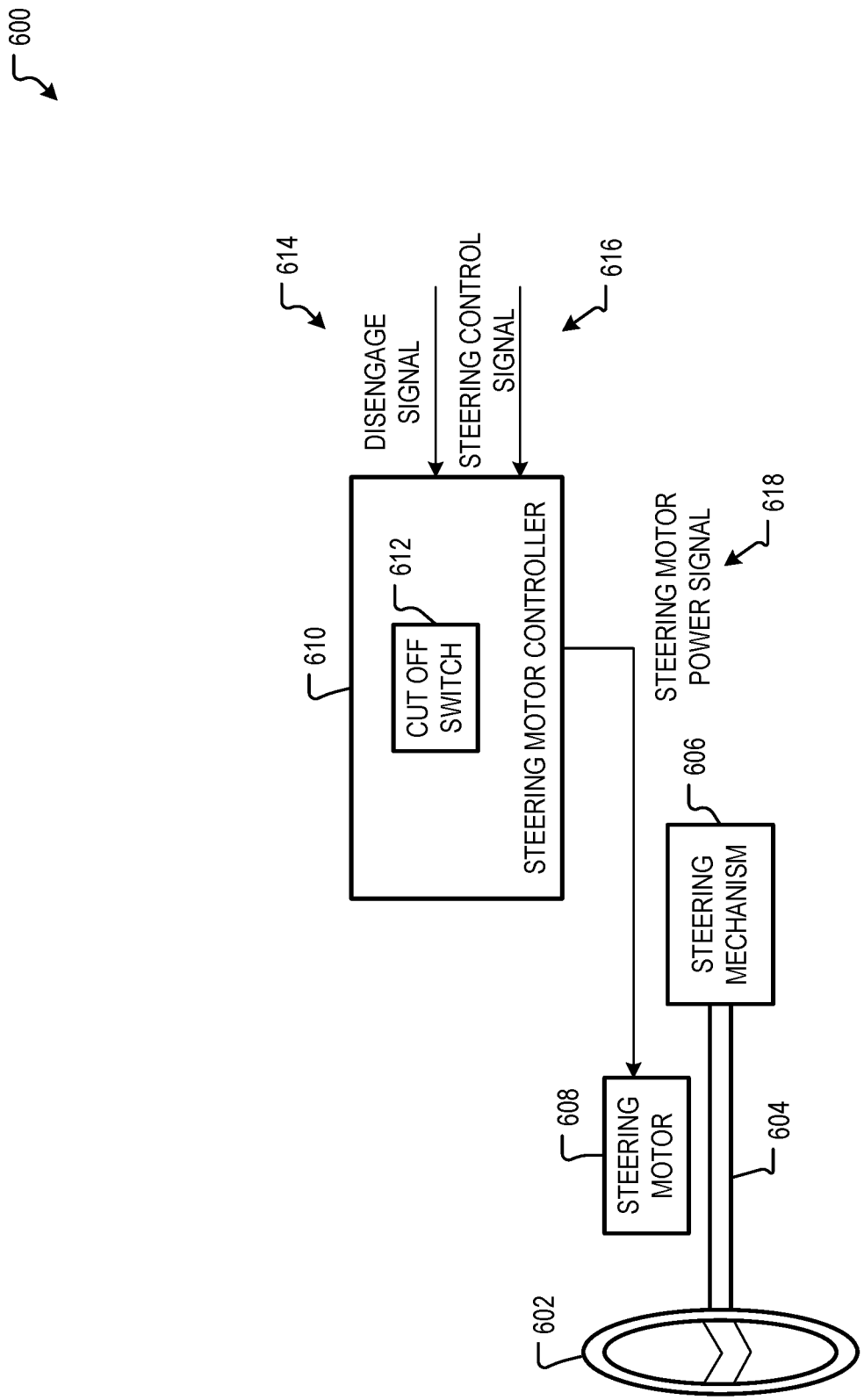
FIG. 6 is diagram showing one example of a steering component. The steering component includes a steering shaft that may be mechanically coupled to a steering wheel for operation by the human user.

FIG. 6 is diagram showing one example of a steering component 600. The steering component includes a steering shaft 604 that may be mechanically coupled to a steering wheel 602 for operation by the human user. A steering mechanism 606, such as a rack-and-pinion, translates rotation of the steering shaft 604 to movement of wheels of the vehicle to steer the vehicle.

A steering motor 608 is positioned to rotate the steering shaft 604 under the control of the vehicle autonomy system. For example, the vehicle autonomy system provides a steering control signal 616 indicating steering input for the vehicle. The steering control signal 616 is provided to a steering motor controller 610. The steering motor controller 610 is in electrical communication with the steering motor 608. The steering motor controller 610 to generates a steering motor power signal 618 that is provided with the steering motor 608, causing the steering motor 608 to rotate the steering shaft 604.

The steering motor controller 610 includes a cut-off switch 612. When a steering disengage signal 614 is provided to the motor controller 610, the cut-off switch 612 is opened, preventing the steering motor power signal 618 from reaching the steering motor 608. The cut-off switch 612 may include an electromechanical mechanism, such as a solenoid, for causing the switch 612 to open in response to the disengage signal 614.

In some examples, the steering motor controller 610 is configured to receive signals on a vehicle network or bus, for example, according to a Controller Area Network (CAN) protocol. The steering motor controller 610 may be configured to cease the steering motor power signal 618 when the steering control signal 616 ceases. The steering motor controller 610 determines that the steering control signal 616 has ceased, for example, if no data is received for a threshold time. In some examples, the steering motor controller 610 determines that the steering control signal 616 has ceased if the steering control signal 616 is outside of parameter thresholds. For example, the motor controller 610 may be programmed to track an error rate, such as a bit error rate, of the steering control signal 616. If the bit error rate exceeds a bit error rate threshold, the steering motor controller 610 may determine that the steering control signal 616 has ceased.

Figure 7:
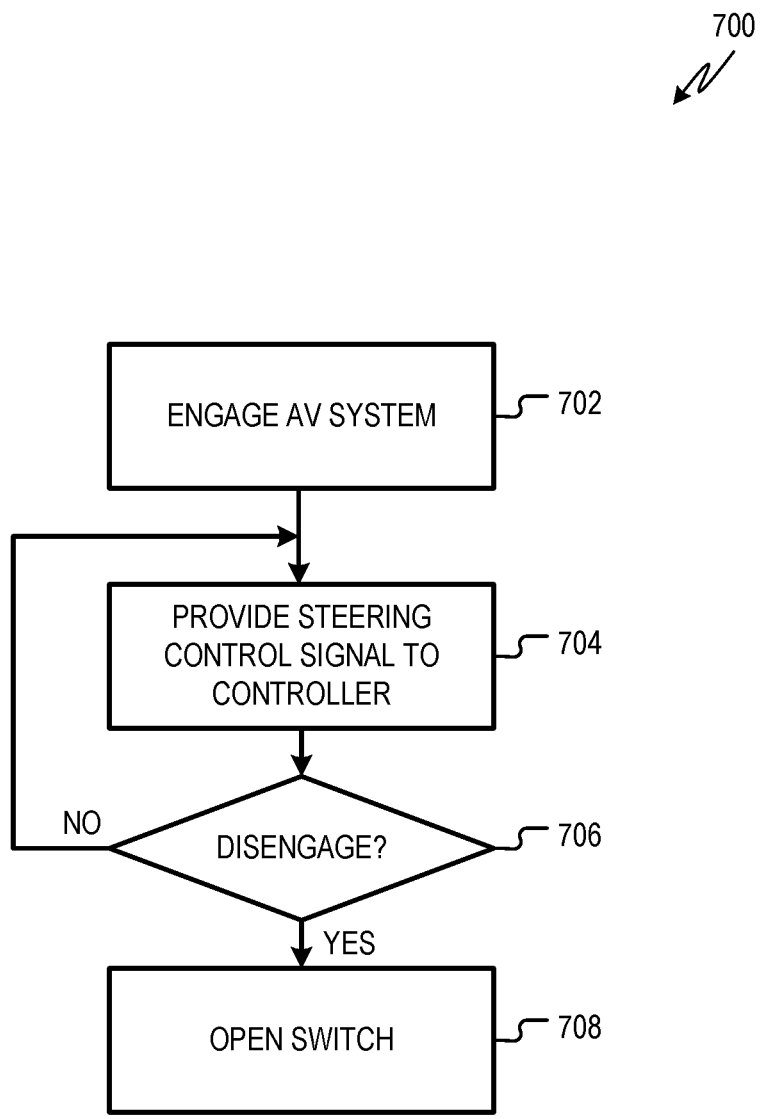
FIG. 7 is a flow chart showing one example of a process flow that may be executed by a vehicle autonomy system and/or a steering component.

FIG. 7 is a flow chart showing one example of a process flow 700 that may be executed by a vehicle autonomy system and/or a steering component, such as the steering component 600 to execute disengagement as described herein. At operation 702, the vehicle autonomy system is engaged. In some examples, the vehicle autonomy system is engaged before the vehicle begins to travel. Also, in some examples, the vehicle autonomy system is engaged while the vehicle is traveling, for example, by a human user.

At operation 704, the vehicle autonomy system provides the steering control signal 616 to the steering motor controller 610. For example, if the vehicle autonomy system generates a motion plan that calls for the vehicle to turn left, the vehicle autonomy system provides a steering control signal 616 that calls for the steering motor 608 to turns the wheels of the vehicle to the left (e.g., by rotating the steering shaft 604 in the appropriate direction). If the vehicle autonomy system generates a motion plan that calls for the vehicle to turn right, the vehicle autonomy system provides a steering control signal 616 that calls for the steering motor 608 to turn the wheels of the vehicle to the right.

At operation 706, the vehicle autonomy system determines if a disengage signal 614 has been received. If not, the vehicle autonomy system continues to provide the steering control signal 616 at operation 704. If, at operation 706, the vehicle autonomy system has received a disengage signal, the cut-off switch 612 is opened, preventing the steering motor power signal 618 from reaching the steering motor 608.

In some examples, operation 706 and 708 are performed by the vehicle independent of the vehicle autonomy system. For example, the disengage signal 614 is provided to the steering motor controller 610 independent of the vehicle autonomy system. In response to the disengage signal 614, the cut-off switch 612 is opened, preventing the vehicle autonomy system (e.g., via the steering control signal 616) from further affecting the vehicle's steering.

Figure 8:
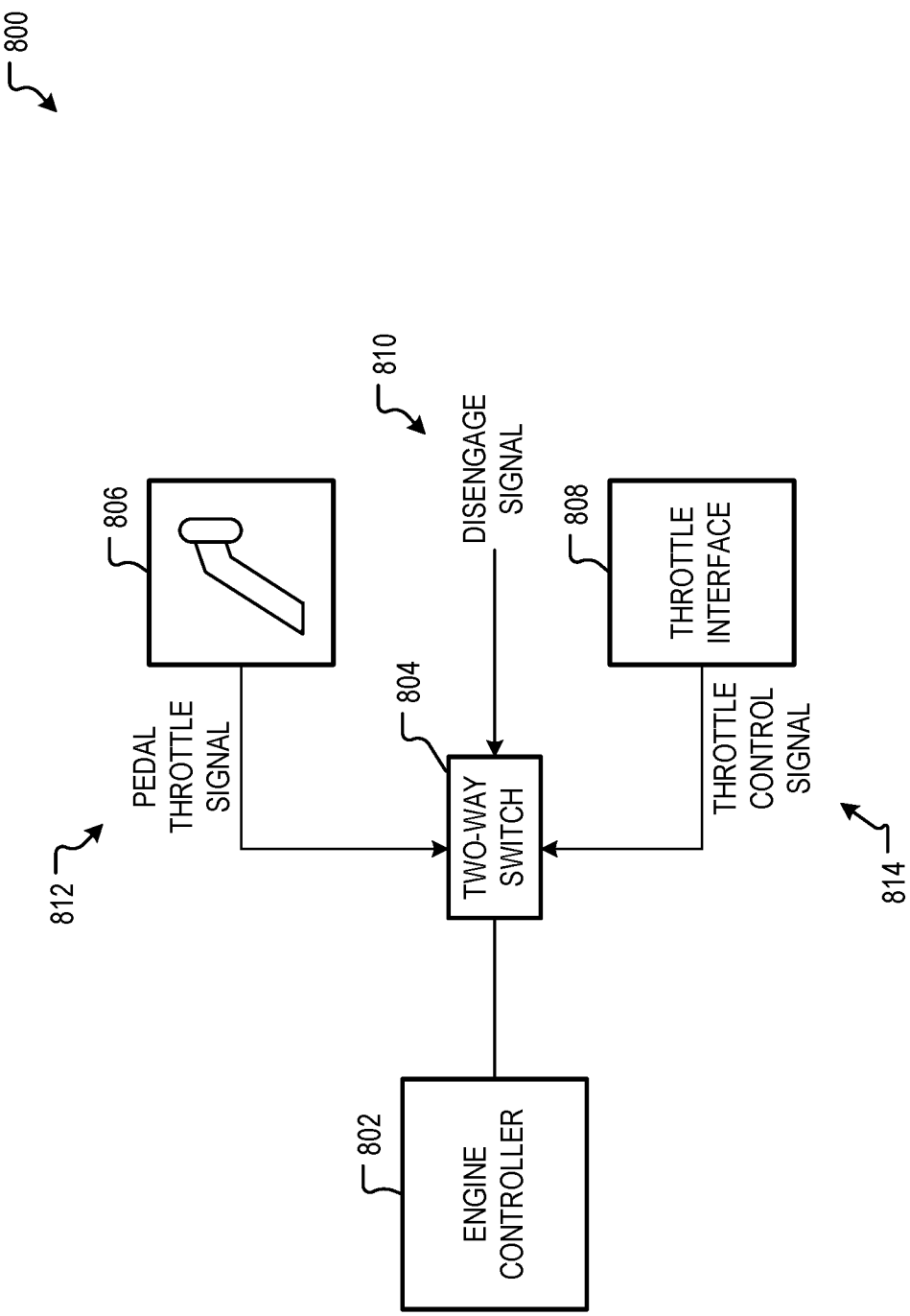
FIG. 8 is a diagram showing one example of a throttle or propulsion component.

FIG. 8 is a diagram showing one example of a throttle or propulsion component 800. The throttle component 800 comprises an engine controller 802 that controls the amount of fuel provided to the vehicle's engine. A throttle pedal 806 generates a pedal throttle signal. A throttle interface, which may be a component of the vehicle autonomy system, generates an automated throttle control signal 814. The pedal throttle signal and the automated throttle control signal are provided to a two-way switch 804. The two-way switch 804 has a first position in which the pedal throttle signal is provided to the engine controller 802. When the two-way switch 804 is in the first position, the engine is throttled by the pedal 806. The two-way switch 804 also has a second position in which the automated throttle control signal 814 is provided to the engine controller 802. When the two-way switch 804 is in the second position, the engine is throttled by the throttle interface 808. When a throttle disengage signal 810 is provided to the two-way switch, it may transition to the first position.

Figure 9:
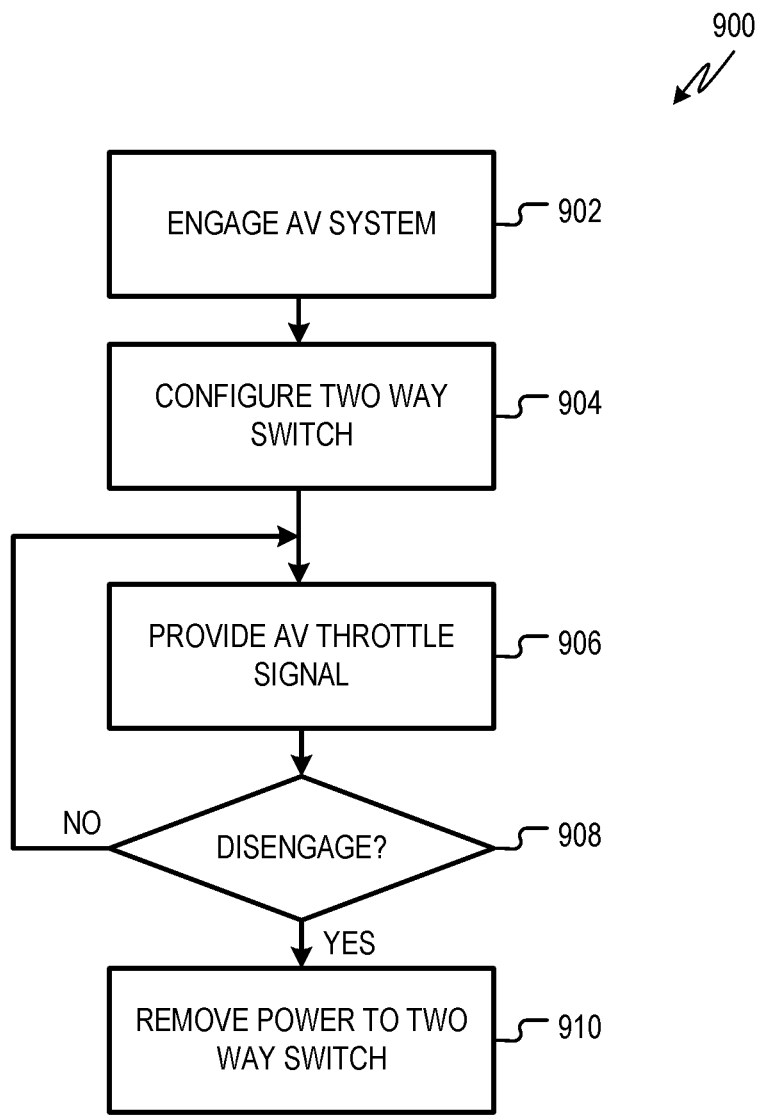
FIG. 9 is a flow chart showing one example of a process flow that may be executed by a vehicle autonomy system and/or a steering component.

FIG. 9 is a flow chart showing one example of a process flow 900 that may be executed by a vehicle autonomy system and/or a steering component, such as the throttle component 800 to execute disengagement as described herein. At operation 902, the vehicle autonomy system is engaged. In some examples, the vehicle autonomy system is engaged before the vehicle begins to travel. Also, in some examples, the vehicle autonomy system is engaged while the vehicle is traveling, for example, by a human user.

At operation 904, the vehicle autonomy system configures the two-way switch 804 to provide the automatic throttle control signal 814 to the engine controller 802 (e.g., instead of the pedal throttle signal 812). The vehicle autonomy system configures the two-way switch 804, for example, by providing the throttle control signal 814. At operation 906, the vehicle autonomy system provides the throttle control signal 814 to the two-way switch 804. For example, if the vehicle autonomy system generates a motion plan that calls for additional throttle to be applied, the vehicle autonomy system provides a throttle control signal 814 that calls for the engine controller 802 to provide additional throttle to the engine. If the vehicle autonomy system generates a motion plan that calls for less throttle to be applied, the vehicle autonomy system provides a throttle control signal 814 that calls for the engine controller 802 to reduce the throttle provided to the engine.

At operation 908, the vehicle autonomy system determines if a disengage signal 810 has been received. If not, the vehicle autonomy system continues to provide the throttle control signal 814 at operation 906. If, at operation 908, the vehicle autonomy system has received a disengage signal 812, the two-way switch 804 changes state to a state that prevents the throttle control signal 814 from reaching the engine controller 802 and affecting the vehicle's throttle level.

In some examples, operation 908 and 910 are performed by the vehicle independent of the vehicle autonomy system. For example, the disengage signal 810 is provided to the two-way switch 804 independent of the vehicle autonomy system. In response to the disengage signal 810, the two-way switch changes state to the state that prevents the throttle control signal 814 from reaching the engine controller 802 and affecting the vehicle's throttle level.

Figure 10:
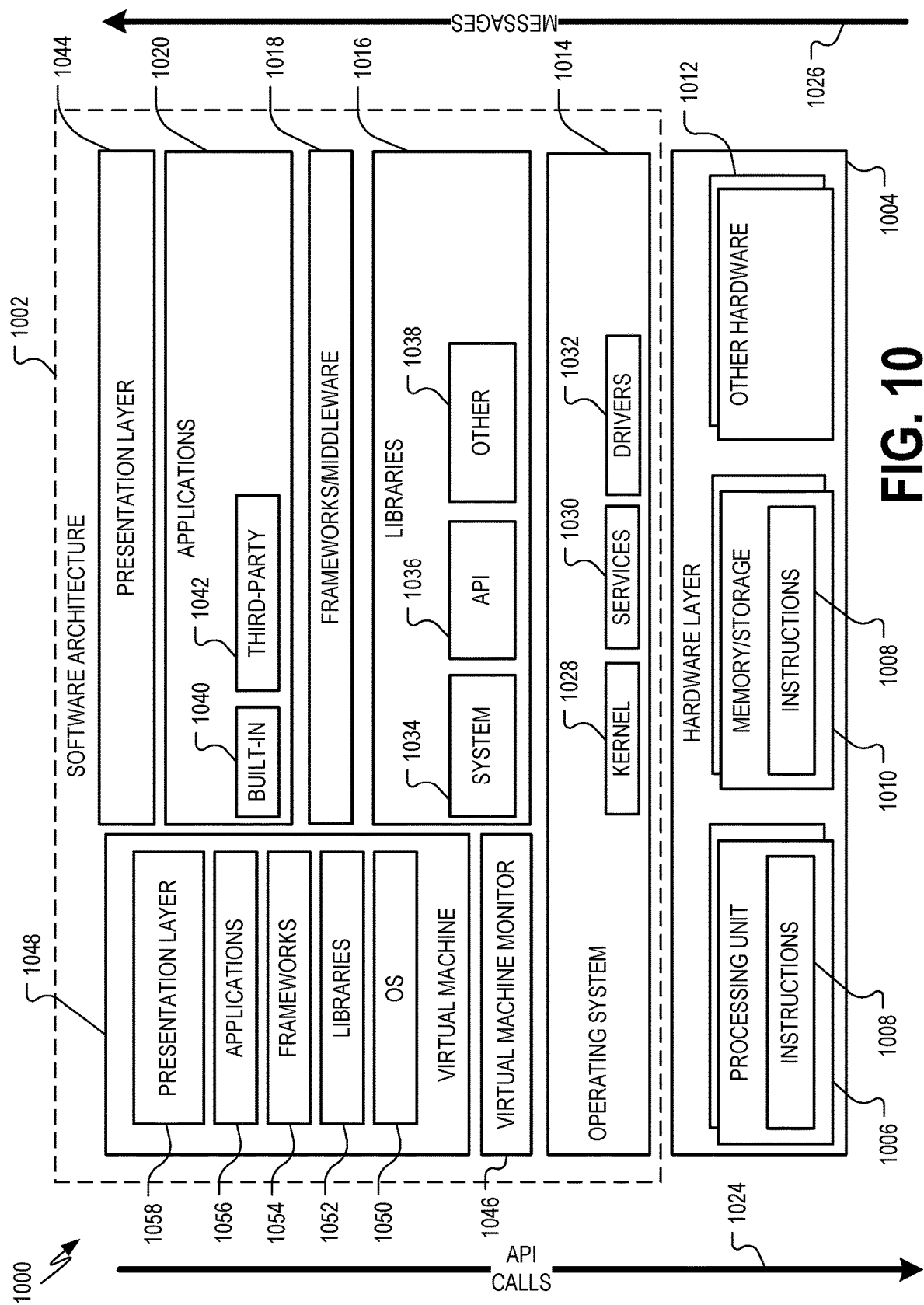
FIG. 10 is a block diagram showing one example of a software architecture for a computing device.

FIG. 10 is a block diagram 1000 showing one example of a software architecture 1002 for a computing device. The software architecture 1002 may be used in conjunction with various hardware architectures, for example, as described herein. FIG. 10 is merely a non-limiting example of a software architecture 1002 and many other architectures may be implemented to facilitate the functionality described herein. A representative hardware layer 1004 is illustrated and can represent, for example, any of the above-referenced computing devices. In some examples, the hardware layer 1004 may be implemented according to an architecture 1100 of FIG. 11 and/or the architecture 1002 of FIG. 10.

The representative hardware layer 1004 comprises one or more processing units 1006 having associated executable instructions 1008. The executable instructions 1008 represent the executable instructions of the software architecture 1002, including implementation of the methods, modules, components, and so forth of FIGS. 1-5. The hardware layer 1004 also includes memory and/or storage modules 1010, which also have the executable instructions 1008. The hardware layer 1004 may also comprise other hardware

1012, which represents any other hardware of the hardware layer 1004, such as the other hardware illustrated as part of the architecture 1100.

In the example architecture of FIG. 10, the software architecture 1002 may be conceptualized as a stack of layers where each layer provides particular functionality. For example, the software architecture 1002 may include layers such as an operating system 1014, libraries 1016, frameworks/middleware 1018, applications 1020, and a presentation layer 1044. Operationally, the applications 1020 and/or other components within the layers may invoke API calls 1024 through the software stack and receive a response, returned values, and so forth illustrated as messages 1026 in response to the API calls 1024. The layers illustrated are representative in nature and not all software architectures have all layers. For example, some mobile or special-purpose operating systems may not provide a frameworks/middleware 1018 layer, while others may provide such a layer. Other software architectures may include additional or different layers.

The operating system 1014 may manage hardware resources and provide common services. The operating system 1014 may include, for example, a kernel 1028, services 1030, and drivers 1032. The kernel 1028 may act as an abstraction layer between the hardware and the other software layers. For example, the kernel 1028 may be responsible for memory management, processor management (e.g., scheduling), component management, networking, security settings, and so on. The services 1030 may provide other common services for the other software layers. In some examples, the services 1030 include an interrupt service. The interrupt service may detect the receipt of a hardware or software interrupt and, in response, cause the software architecture 1002 to pause its current processing and execute an ISR when an interrupt is received. The ISR may generate an alert.

The drivers 1032 may be responsible for controlling or interfacing with the underlying hardware. For instance, the drivers 1032 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1016 may provide a common infrastructure that may be used by the applications 1020 and/or other components and/or layers. The libraries 1016 typically provide functionality that allows other software modules to perform tasks in an easier fashion than by interfacing directly with the underlying operating system 1014 functionality (e.g., kernel 1028, services 1030, and/or drivers 1032). The libraries 1016 may include system libraries 1034 (e.g., C standard library) that may provide functions such as memory allocation functions, string manipulation functions, mathematic functions, and the like. In addition, the libraries 1016 may include API libraries 1036 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1016 may also include a wide variety of other libraries 1038 to provide many other APIs to the applications 1020 and other software components/modules.

The frameworks 1018 (also sometimes referred to as middleware) may provide a higher-level common infrastructure that may be used by the applications 1020 and/or other software components/modules. For example, the frameworks 1018 may provide various graphical user interface (GUI) functions, high-level resource management, high-level location services, and so forth. The frameworks 1018 may provide a broad spectrum of other APIs that may be used by the applications 1020 and/or other software components/modules, some of which may be specific to a particular operating system or platform.

The applications 1020 include built-in applications 1040 and/or third-party applications 1042. Examples of representative built-in applications 1040 may include, but are not limited to, a contacts application, a browser application, a book reader application, a location application, a media application, a messaging application, and/or a game application. The third-party applications 1042 may include any of the built-in applications 1040 as well as a broad assortment of other applications. In a specific example, the third-party application 1042 (e.g., an application developed using the Android™ or iOS™ software development kit (SDK) by an entity other than the vendor of the particular platform) may be mobile software running on a mobile operating system such as iOS™, Android™, Windows® Phone, or other computing device operating systems. In this example, the third-party application 1042 may invoke the API calls 1024 provided by the mobile operating system such as the operating system 1014 to facilitate functionality described herein.

The applications 1020 may use built-in operating system functions (e.g., kernel 1028, services 1030, and/or drivers 1032), libraries (e.g., system libraries 1034, API libraries 1036, and other libraries 1038), or frameworks/middleware 1018 to create user interfaces to interact with users of the system. Alternatively, or additionally, in some systems, interactions with a user may occur through a presentation layer, such as the presentation layer 1044. In these systems, the application/module "logic" can be separated from the aspects of the application/module that interact with a user.

Some software architectures use virtual machines. For example, systems described herein may be executed using one or more virtual machines executed at one or more server computing machines. In the example of FIG. 10, this is illustrated by a virtual machine 1048. A virtual machine creates a software environment where applications/modules can execute as if they were executing on a hardware computing device. The virtual machine 1048 is hosted by a host operating system (e.g., the operating system 1014) and typically, although not always, has a virtual machine monitor 1046, which manages the operation of the virtual machine 1048 as well as the interface with the host operating system (e.g., the operating system 1014). A software architecture executes within the virtual machine 1048, such as an operating system 1050, libraries 1052, frameworks/middleware 1054, applications 1056, and/or a presentation layer 1058. These layers of software architecture executing within the virtual machine 1048 can be the same as corresponding layers previously described or may be different.

Figure 11:
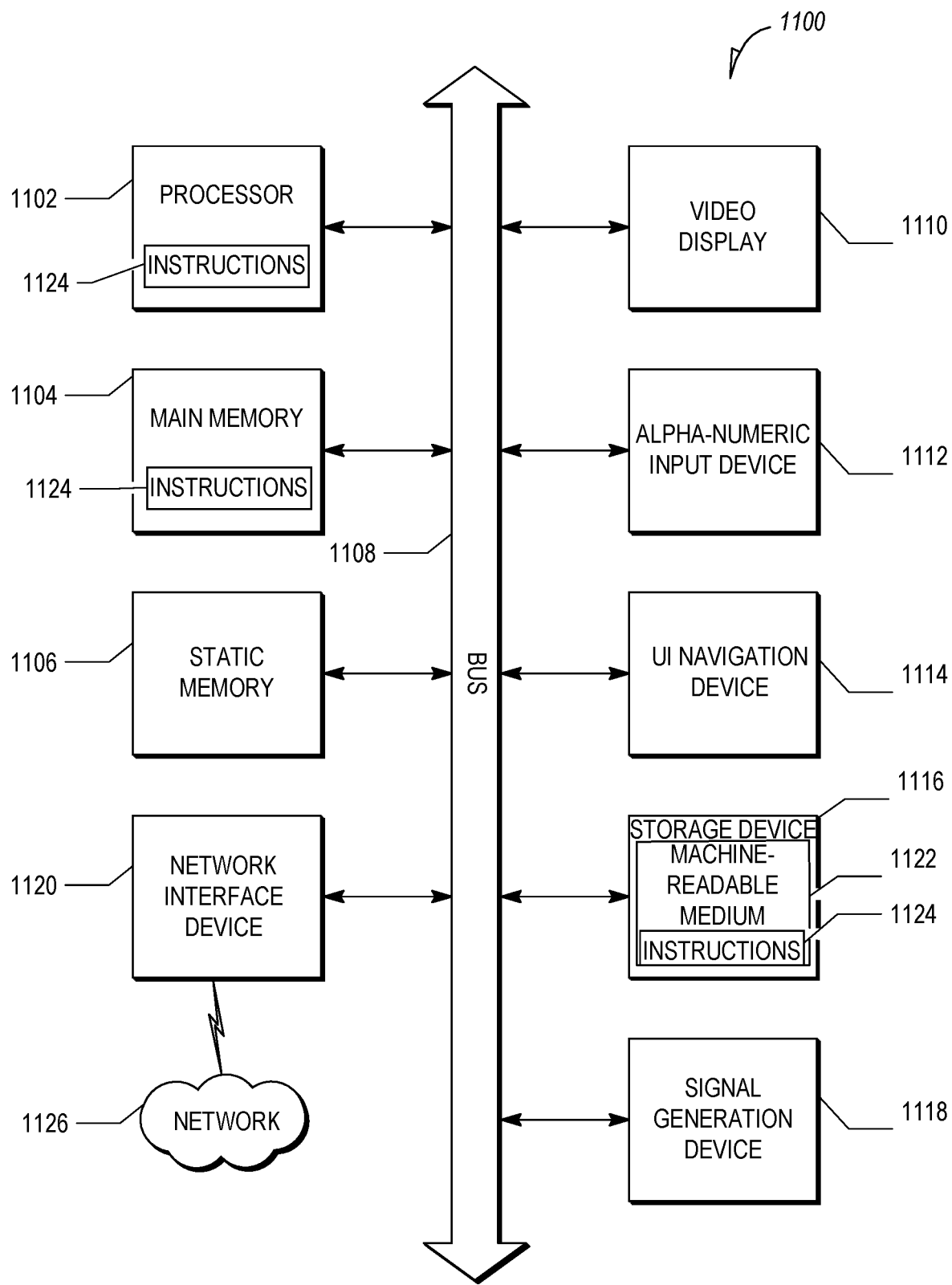
FIG. 11 is a block diagram illustrating a computing device hardware architecture, within which a set or sequence of instructions can be executed to cause a machine to perform examples of any one of the methodologies discussed herein.

FIG. 11 is a block diagram illustrating a computing device hardware architecture 1100, within which a set or sequence of instructions can be executed to cause a machine to perform examples of any one of the methodologies discussed herein. The architecture 1100 may describe, a computing device for executing the vehicle autonomy system, localizer(s), and/or pose filter described herein.

The architecture 1100 may operate as a standalone device or may be connected (e.g., networked) to other machines. In a networked deployment, the architecture 1100 may operate in the capacity of either a server or a client machine in server-client network environments, or it may act as a peer machine in peer-to-peer (or distributed) network environments. The architecture 1100 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 1100 includes a processor unit 1102 comprising at least one processor (e.g., a central processing unit (CPU), a graphics processing unit (GPU), or both, processor cores, compute nodes, etc.). The architecture 1100 may further comprise a main memory 1104 and a static memory 1106, which communicate with each other via a link 1108 (e.g., bus). The architecture 1100 can further include a video display unit 1110, an input device 1112 (e.g., a keyboard), and a UI navigation device 1114 (e.g., a mouse). In some examples, the video display unit 1110, input device 1112, and UI navigation device 1114 are incorporated into a touchscreen display. The architecture 1100 may additionally include a storage device 1116 (e.g., a drive unit), a signal generation device 1118 (e.g., a speaker), a network interface device 1120, and one or more sensors (not shown), such as a Global Positioning System (GPS) sensor, compass, accelerometer, or other sensor.

In some examples, the processor unit 1102 or another suitable hardware component may support a hardware interrupt. In response to a hardware interrupt, the processor unit 1102 may pause its processing and execute an ISR, for example, as described herein.

The storage device 1116 includes a machine-readable medium 1122 on which is stored one or more sets of data structures and instructions 1124 (e.g., software) embodying or used by any one or more of the methodologies or functions described herein. The instructions 1124 can also reside, completely or at least partially, within the main memory 1104, within the static memory 1106, and/or within the processor unit 1102 during execution thereof by the architecture 1100, with the main memory 1104, the static memory 1106, and the processor unit 1102 also constituting machine-readable media.

Executable Instructions and Machine-Storage Medium

The various memories (i.e., 1104, 1106, and/or memory of the processor unit(s) 1102) and/or storage device 1116 may store one or more sets of instructions and data structures (e.g., instructions) 1124 embodying or used by any one or more of the methodologies or functions described herein. These instructions, when executed by processor unit(s) 1102 cause various operations to implement the disclosed examples.

As used herein, the terms "machine-storage medium," "device-storage medium," "computer-storage medium" (referred to collectively as "machine-storage medium 1122") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1122 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 1122 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 1124 can further be transmitted or received over a communications network 1126 using a transmission medium via the network interface device 1120 using any one of a number of well-known transfer protocols (e.g., HTTP). Examples of communication networks include a LAN, a WAN, the Internet, mobile telephone networks, plain old telephone service (POTS) networks, and wireless data networks (e.g., Wi-Fi, 3G, and 11G LTE/LTE-A or WiMAX networks). The term "transmission medium" shall be taken to include any intangible medium that is capable of storing, encoding, or carrying instructions for execution by the machine, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of said features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

The invention claimed is:

1. A vehicle, comprising:
   a foundation brake
   a pressurized air reservoir;
   a pedal valve in fluid communication with the pressurized air reservoir;
   an automated control (AC) valve in fluid communication with the pressurized air reservoir;
   a shuttle valve comprising a first input; a second input, and an output, wherein the first input is in fluid communication with the pedal valve, wherein the second input is in fluid communication with the AC valve; and wherein the output is in fluid communication with the foundation brake to engage the foundation brake responsive to pressurized air being provided at the output; and
   a cut-off valve in fluid communication between the AC valve and the shuttle valve, wherein the cut-off valve, when in a closed position, prevents pressurized air from reaching the shuttle valve via the AC valve.

2. The vehicle of claim 1, further comprising a vehicle autonomy system programmed to perform operations comprising:
   in fully-autonomous mode or a semi-autonomous mode, providing power to the cut-off valve to open the cut-off valve;
   modulating the AC valve to control the foundation brake;
   receiving a brake disengage signal; and
   after receiving the brake disengage signal, removing power from the cut-off valve to close the cut-off valve.

3. The vehicle of claim 1, wherein the cut-off valve is mechanically biased to the closed position.

4. The vehicle of claim 1, further comprising a power line in electrical communication with the cut-off valve, wherein the cut-off valve is configured to the closed position when a signal on the power line is less than a threshold power, and wherein the cut-off valve is configured to an open position when the signal on the power line is greater than the threshold power, wherein when the cut-off valve is configured to the open position, pressurized air is permitted to reach the shuttle valve via the AC valve.

5. The vehicle of claim 1, further comprising a vehicle autonomy system programmed to perform operations comprising providing a braking control signal, and wherein the AC valve is configured to change state responsive to the braking control signal.

6. The vehicle of claim 1, further comprising:
   a steering motor positioned to actuate a steering mechanism; and
   a steering motor controller in electrical communication with the steering motor to provide a steering motor power signal to the steering motor, wherein the steering motor controller comprises a cut-off switch to cut-off the steering motor power signal from the steering motor in response to an steering disengage signal.

7. The vehicle of claim 1, further comprising:
   a steering motor positioned to actuate a steering mechanism; and
   a steering motor controller in electrical communication with the steering motor to provide a steering motor power signal to the steering motor and in electrical communication with a vehicle autonomy system via a vehicle network, wherein the steering motor controller is configured to perform operations comprising:
   determining that a steering control signal from the vehicle autonomy system has ceased; and
   responsive to determining that the steering control signal has ceased, removing the steering motor power signal from the steering motor.

8. The vehicle of claim 1, further comprising:
   a throttle pedal configured to provide a pedal throttle signal; and
   a two-way switch comprising:
   a first input connected to receive the pedal throttle signal;
   a second input connected to receive a throttle control signal from a vehicle autonomy system; and
   an output electrically coupled to an engine controller, wherein the two-way switch is configured to disconnect the second input from the output upon receipt of a throttle disengage signal.

9. The vehicle of claim 8, wherein the two-way switch is also configured to connect the first input to the output upon receipt of the throttle disengage signal.

10. A method of controlling a vehicle, comprising:
    providing power to a cut-off valve in fluid communication between an automated control (AC) valve and a shuttle valve, wherein the cut-off valve opens in response to a power signal on a power line, causing fluid communication between the AC valve and the shuttle valve;
    modulating, by a vehicle autonomy system, the AC valve to control a level of pressurized air provided from a pressurized air reservoir to a foundation brake via the AC valve and the shuttle valve; and
    in response to an automated disengage signal, closing the cut-off valve to prevent pressurized air from reaching the shuttle valve via the AC valve and permit pressurized air ch the shuttle valve via a pedal valve.

11. The method of claim 10, further comprising providing the automated disengage signal to the cut-off valve, wherein providing the automated disengage signal comprises removing power from a power line of the cut-off valve.

12. The method of claim 10, further comprising providing the automated disengage signal to the cut-off valve, wherein providing the automated disengage signal comprises reducing a power of a signal on a power line of the cut-off valve below a threshold level.

13. The method of claim 10, further comprising generating, by the vehicle autonomy system, a braking control signal, wherein the modulating of the AC valve is based on the braking control signal.

14. The method of claim 10, further comprising:
    providing, by the vehicle autonomy system, a steering control signal to a steering motor controller;

in response to the steering control signal, providing, by the steering motor controller, steering motor power signal to a steering motor;
receiving, by the steering motor controller, an steering disengage signal; and
after receiving the steering disengage signal, opening, by the steering motor controller; a cut-off switch to break the steering motor power signal.

15. The method of claim 14, wherein the steering control signal is provided to the steering motor controller via a controller area network (CAN) bus, and wherein providing the steering disengage signal comprises ceasing the steering control signal.

16. The method of claim 10, further comprising:
providing, by the vehicle autonomy system, a steering control signal to a steering motor controller;
in response to the steering control signal, providing, by the steering motor controller, steering motor power signal to a steering motor;
determining, by the steering motor controller, that a steering control signal from the vehicle autonomy system has ceased; and
responsive to determining that the steering control signal has ceased, removing the steering motor power signal from the steering motor by the steering motor controller.

17. The method of claim 10, further comprising:
providing, by the vehicle autonomy system, an automated throttle control signal to a two-way switch, wherein the two-way switch is in a first position connecting the automated throttle control signal to an engine controller;
receiving, by the two-way switch, a throttle disengage signal to the two-way switch; and
in response to the throttle disengage signal, assuming, by the two-way switch, a second position disconnecting the automated throttle control signal from the engine controller.

18. The method of claim 17, wherein, in the second position, the two-way switch also connects a pedal throttle signal to the engine controller.

19. A system for controlling a vehicle, comprising:
means for providing power to a cut-off valve in fluid communication between an automated control (AC) valve and a shuttle valve, wherein the cut-off valve opens in response to a power signal on a power line, causing fluid communication between the AC valve and the shuttle valve;
means for modulating, by a vehicle autonomy system, the AC valve to control a level of pressurized air provided from a pressurized air reservoir to a foundation brake via the AC valve and the shuttle valve; and
means for, in response to an automated disengage signal, closing the cut-off valve to prevent pressurized air from reaching the shuttle valve via the AC valve and permit pressurized air to reach the shuttle valve via a pedal valve.

20. The system of claim 19, further comprising means for providing the automated disengage signal to the cut-off valve, wherein providing the automated disengage signal comprises removing power from a power line of the cut-off valve.

* * * * *

UNITED STATES PATENT AND TRADEMARK OFFICE
CERTIFICATE OF CORRECTION

PATENT NO. : 10,647,329 B2
APPLICATION NO. : 15/928739
DATED : May 12, 2020
INVENTOR(S) : Cohen et al.

Page 1 of 1

It is certified that error appears in the above-identified patent and that said Letters Patent is hereby corrected as shown below:

In the Claims

In Column 19, Line 30, in Claim 1, delete "input;" and insert --input,-- therefor In Column 19, Line 33, in Claim 1, delete "valve;" and insert --valve,-- therefor In Column 20, Line 51, in Claim 10, delete "ch" and insert --to reach-- therefor In Column 21, Line 7, in Claim 14, delete "controller;" and insert --controller,-- therefor Signed and Sealed this
Seventeenth Day of November, 2020

Andrei Iancu
*Director of the United States Patent and Trademark Office*